(12) United States Patent
Hallman et al.

(10) Patent No.: US 10,247,297 B2
(45) Date of Patent: Apr. 2, 2019

(54) APPARATUS FOR A GEARBOX WITH MULTIPLE SCAVENGE PORTS

(71) Applicant: General Electric Company, Schenectady, NY (US)

(72) Inventors: Darren Lee Hallman, Scotia, NY (US); Joseph Robert Dickman, Monroe, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 199 days.

(21) Appl. No.: 15/408,988

(22) Filed: Jan. 18, 2017

(65) Prior Publication Data
US 2018/0202536 A1    Jul. 19, 2018

(51) Int. Cl.
*F16H 57/04* (2010.01)
*F02C 7/36* (2006.01)
(Continued)

(52) U.S. Cl.
CPC ........... *F16H 57/0424* (2013.01); *F02C 7/06* (2013.01); *F02C 7/36* (2013.01); *F16H 1/28* (2013.01);
(Continued)

(58) Field of Classification Search
CPC ............. F16H 57/0424; F16H 57/0486; F16H 57/0423; F16H 57/0482; F16H 57/0494; F16H 57/0447; F02C 7/06; F05D 2260/97
See application file for complete search history.

(56) References Cited

U.S. PATENT DOCUMENTS

| 5,242,033 A | 9/1993 | Toraason |
| 5,489,190 A | 2/1996 | Sullivan |

(Continued)

FOREIGN PATENT DOCUMENTS

| DE | 10 2011 108 170 A1 | 1/2013 |
| DE | 10 2011 108170 A1 | 1/2013 |

(Continued)

OTHER PUBLICATIONS

Lee et al., "Factors Affecting the Behaviour and Efficiency of a Targeted Jet Delivering Oil to a Bearing Lubrication System", Aircraft Engine, The American Society of Mechanical Engineers, vol. 2, pp. 191-199, 2004, Vienna, Austria.

(Continued)

*Primary Examiner* — Sherry L Estremsky
(74) *Attorney, Agent, or Firm* — GE Global Patent Operation; Nitin Joshi

(57) ABSTRACT

A gearbox includes a gearbox housing, at least one gear, and a plurality of scavenge ports. The gearbox housing has a top portion, two horizontal portions, and a bottom portion opposite the top portion. The bottom portion is oriented in the direction a fluid would drain under the influence of gravity during normal operations. The two horizontal portions are oriented at a right angle relative to the bottom portion. The at least one gear is disposed within the gearbox housing and has a first axial position. The plurality of scavenge ports are defined by the gearbox housing. The plurality of scavenge ports are aligned axially with the at least one gear at the first axial position. At least one scavenge port of the plurality of scavenge ports is located within the gearbox housing at the two horizontal portions.

23 Claims, 2 Drawing Sheets

(51) Int. Cl.
*F02C 7/06* (2006.01)
*F16H 1/28* (2006.01)

(52) U.S. Cl.
CPC ..... *F16H 57/0409* (2013.01); *F16H 57/0447* (2013.01); *F16H 57/0482* (2013.01); *F16H 57/0486* (2013.01); *F05D 2220/32* (2013.01); *F05D 2260/40311* (2013.01); *F05D 2260/97* (2013.01); *F05D 2260/98* (2013.01); *F16H 57/0423* (2013.01)

(56) References Cited

U.S. PATENT DOCUMENTS

| | | | |
|---|---|---|---|
| 7,390,277 B2* | 6/2008 | Egawa | F16H 1/32 475/159 |
| 7,878,303 B2 | 2/2011 | Munson | |
| 8,123,413 B2 | 2/2012 | Tambe et al. | |
| 8,172,717 B2 | 5/2012 | Lopez et al. | |
| 8,198,744 B2 | 6/2012 | Kern et al. | |
| 8,201,663 B2 | 6/2012 | Munson | |
| 8,235,861 B2 | 8/2012 | Lopez et al. | |
| 8,287,423 B2 | 10/2012 | Lopez et al. | |
| 8,292,510 B2 | 10/2012 | Glahn et al. | |
| 8,298,114 B2 | 10/2012 | Lopez et al. | |
| 8,459,872 B2 | 6/2013 | Nies et al. | |
| 8,491,435 B2 | 7/2013 | Ghanime et al. | |
| 8,506,446 B2 | 8/2013 | Minadeo et al. | |
| 8,517,672 B2 | 8/2013 | McCooey | |
| 8,550,955 B2 | 10/2013 | Erno et al. | |
| 8,550,957 B2 | 10/2013 | Erno et al. | |
| 8,657,714 B1 | 2/2014 | Ghanime et al. | |
| 8,696,314 B2 | 4/2014 | Mashue et al. | |
| 8,727,629 B2 | 5/2014 | Do et al. | |
| 8,727,632 B2 | 5/2014 | Do et al. | |
| 8,777,802 B2 | 7/2014 | Erno et al. | |
| 8,857,192 B2 | 10/2014 | Huang et al. | |
| 8,900,090 B2 | 12/2014 | Sheridan | |
| 8,904,746 B2 | 12/2014 | Fang et al. | |
| 8,920,283 B2 | 12/2014 | Richards | |
| 8,939,864 B2* | 1/2015 | McCune | F01D 5/027 475/331 |
| 8,985,277 B2 | 3/2015 | Hetherington et al. | |
| 9,038,779 B2 | 5/2015 | McCune et al. | |
| 9,989,143 B2* | 6/2018 | Fomison | F16H 57/0409 |
| 2018/0274408 A1* | 9/2018 | Goodier | F01M 11/0458 |

FOREIGN PATENT DOCUMENTS

| | | |
|---|---|---|
| EP | 2 559 913 A1 | 2/2013 |
| EP | 2 672 148 B1 | 11/2014 |
| EP | 2803436 A2 | 11/2014 |

OTHER PUBLICATIONS

Don D. Winfree, "Reducing Gear Windage Losses From High Speed Gears and Applying These Principles to Actual Running Hardware", ASME 2013 Power Transmission and Gearing Conference,The American Society of Mechanical Engineers, vol. 5, pp. 16, 2013, Portland, Oregon, USA.

Office Action issued in connection with corresponding CA Application No. 2990788 dated Oct. 25, 2018.

Extended European Search Report and Opinion issued in connection with corresponding EP Application No. 18150801.1 dated May 22, 2018.

* cited by examiner

APPARATUS FOR A GEARBOX WITH MULTIPLE SCAVENGE PORTS

BACKGROUND

The field of the disclosure relates generally to an apparatus for gearboxes in aviation engines and, more particularly, to an apparatus for a gearbox with multiple scavenge ports.

At least some aircraft engines include a gearbox including a plurality of gears. The gears within the gearbox require lubrication to reduce friction and to cool the gears. The lubricant within the gearbox requires cooling during operation and occasionally needs to be replaced. A scavenge port positioned at a lower portion of the gearbox removes the lubricant for cooling while an addition port adds fresh, cooled lubricant to the gearbox. The scavenge port relies on gravity to channel degraded lubricant to the lower portion of the gearbox. However, the rotational speed of the gears within the gearbox increase as aircraft engine speeds increase. The increased rotational speed of the gears centrifugally accelerates lubricant into a housing of the gearbox. The centrifugal acceleration is greater than the acceleration due to gravity and prevents the heated lubricant from draining into the scavenge port. Additionally, lubricant flung out from each planet gear is accelerated into the gearbox housing and does not drain into the scavenge port. Thus, a single scavenge port positioned t a lower portion of the gearbox is insufficient to remove stagnant lubricant in the gearbox. Lubricant remaining in the gearbox housing increases windage, decreases power output, and decreases the fuel efficiency of the aircraft engine.

BRIEF DESCRIPTION

In one aspect, a gearbox is provided. The gearbox includes a gearbox housing, at least one gear, and a plurality of scavenge ports. The gearbox housing has a top portion, two horizontal portions, and a bottom portion opposite the top portion. The bottom portion is oriented in the direction a fluid would drain under the influence of gravity during normal operations. The horizontal portions are oriented at a right angle relative to the bottom portion. The at least one gear is disposed within the gearbox housing and has a first axial position. The plurality of scavenge ports are defined by the gearbox housing. The plurality of scavenge ports are aligned axially with the at least one gear at the first axial position. At least one scavenge port of the plurality of scavenge ports is located within the gearbox housing at the horizontal portions.

In another aspect, a gearbox is provided. The gearbox includes a gearbox housing, a gear assembly, and a plurality of scavenge ports. The gearbox housing has a top portion, two horizontal portions, and a bottom portion opposite the top portion. The bottom portion is oriented in the direction a fluid would drain under the influence of gravity during normal operations. The horizontal portions are oriented at a right angle relative to the bottom portion. The gear assembly is disposed within the gearbox housing and has a first axial position. The gear assembly includes a sun gear, a ring gear, and a plurality of planet gears coupled to the ring gear and the sun gear. The plurality of scavenge ports are defined by the gearbox housing. The plurality of scavenge ports are aligned axially with the gear assembly at the first axial position. At least one scavenge port of the plurality of scavenge ports is located within the gearbox housing at the horizontal portions.

In yet another aspect, a turbomachine is provided. The turbomachine includes a power shaft, a gearbox housing, a gear assembly, and a plurality of scavenge ports. The gearbox housing has a top portion, two horizontal portions, and a bottom portion opposite the top portion. The bottom portion is oriented in the direction a fluid would drain under the influence of gravity during normal operations. The horizontal portions are oriented at a right angle relative to the bottom portion. The gear assembly is disposed within the gearbox housing and has a first axial position. The gear assembly is rotatably coupled to the power shaft. The gear assembly includes a sun gear, a ring gear, and a plurality of planet gears coupled to the ring gear and the sun gear. The plurality of scavenge ports are defined by the gearbox housing. The plurality of scavenge ports are aligned axially with the gear assembly at the first axial position. At least one scavenge port of the plurality of scavenge ports is located within the gearbox housing at the horizontal portions.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the gearbox with multiple scavenge ports described herein facilitates removal of lubricant from the gearbox. The gearbox includes a gearbox housing and a gear assembly disposed within the gearbox housing. The gearbox housing has a generally annular shape and includes a plurality of scavenge ports to remove lubricant. At least one of the scavenge ports is coupled to a bottom portion of the gearbox housing to collect lubricant channeled to the bottom of the gearbox housing by gravity. At least one scavenge port is coupled to a side portion of the gearbox housing to collect lubricant which is stagnant within the gearbox housing due to the centrifugal force of the gear assembly. Removing stagnant lubricant reduces windage within the gearbox housing, increases the power output of the gearbox, and increases the fuel efficiency of the aircraft engine.

Figure 1:
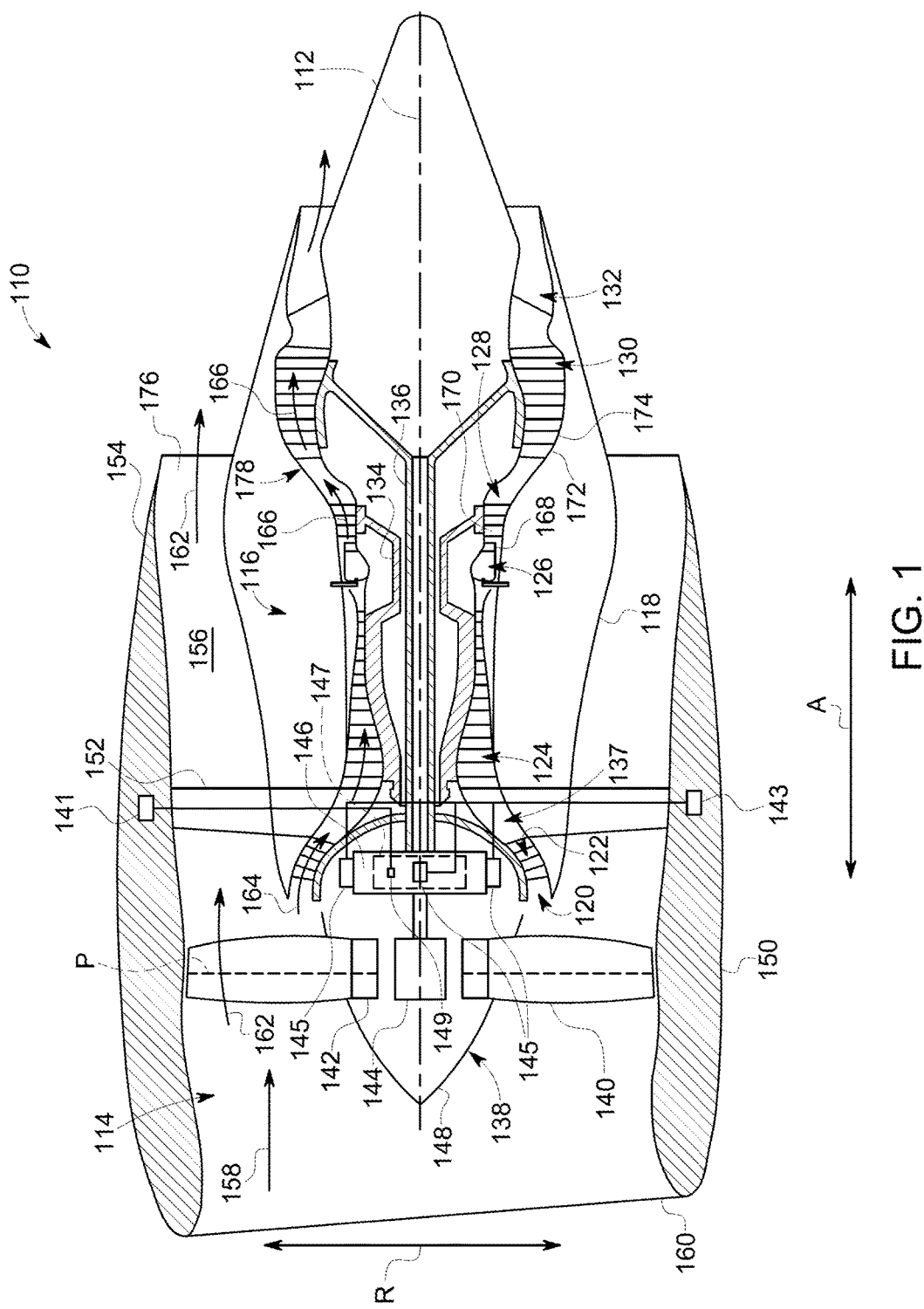
FIG. 1 is a schematic view of an exemplary gas turbine engine.

FIG. 1 is a schematic cross-sectional view of a gas turbine engine 110 in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section 123, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes an epicyclic gear train 147 for adjusting the rotational speed of fan 138 relative to LP shaft 136 to a more efficient rotational fan speed. In an alternative embodiment, fan blade 140 is a fixed pitch fan blade rather than a variable pitch fan blade. Power gearbox 146 includes a plurality of scavenge ports 145 and at least one lubrication supply port 149. A lubrication supply system 141 channels a flow of lubricant to lubrication supply port 149 which channel a flow of lubrication into power gearbox 146 to lubricate and cool epicyclic gear train 147. Scavenge ports 145 channel a flow of lubrication out of power gearbox 146 to a lubrication return system 143. In the exemplary embodiment, the flow of lubricant into power gearbox 146 includes a flow of oil. However, the flow of lubricant into power gearbox 146 may include any lubricant which enables power gearbox 146 to operate as described herein.

In the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate which causes power gear box 146 to rotate LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine.

Figure 2:
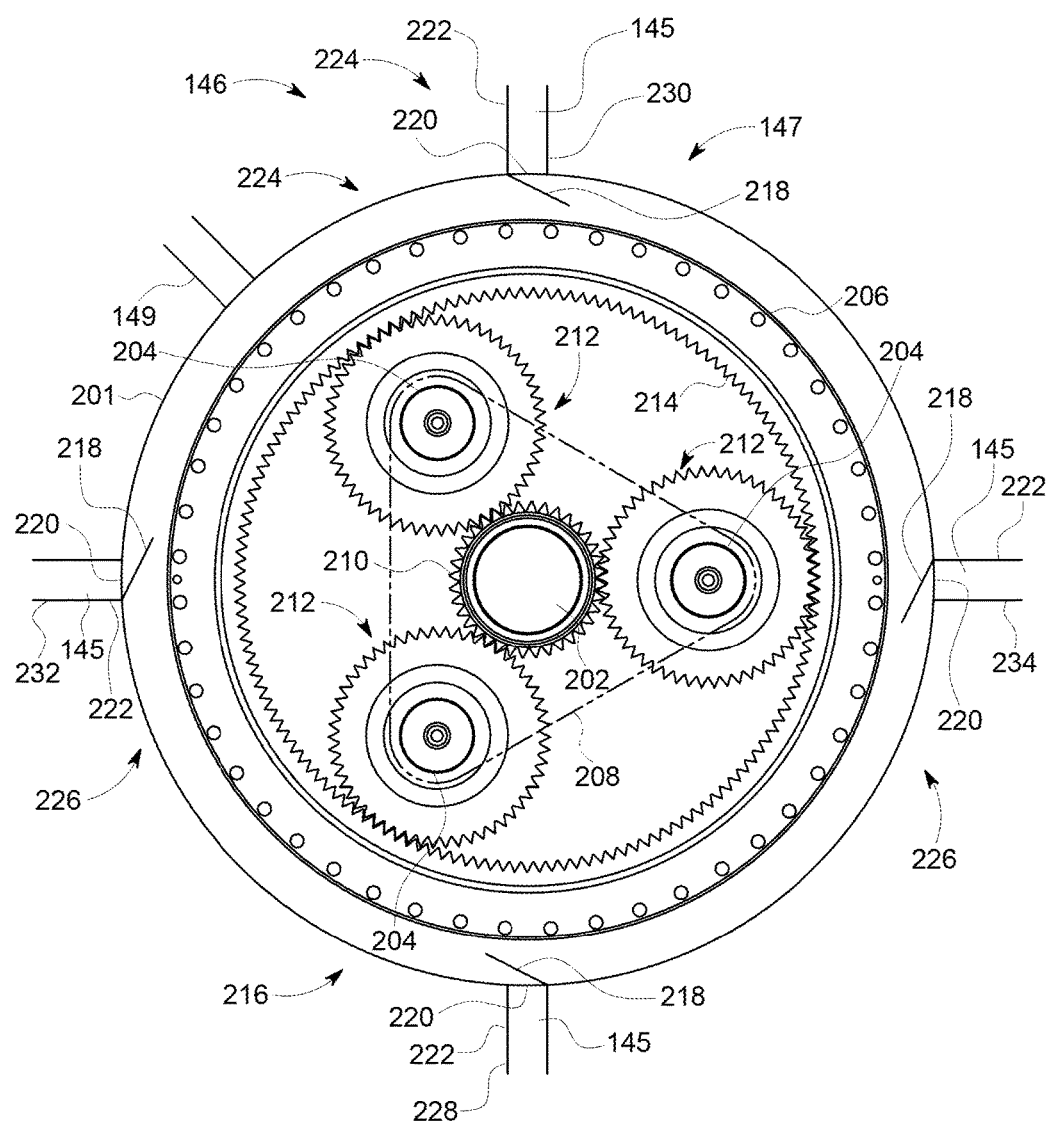
FIG. 2 is a partial cutaway schematic diagram of an exemplary gearbox that is used with the gas turbine engine shown in FIG. 1.

FIG. 2 is a partial cutaway schematic diagram of power gearbox 146. In the exemplary embodiment, epicyclic gear train 147 is a planetary gear train. In one embodiment, epicyclic gear train 147 is housed within a power gearbox housing 201 which includes an annular shape. Power gearbox 146 includes scavenge ports 145 and at least one lubrication supply port 149. Lubrication supply system 141 (shown in FIG. 1) channels a flow of lubricant to lubrication supply port 149 which channel a flow of lubrication into power gearbox housing 201 to lubricate and cool epicyclic gear train 147. Scavenge ports 145 channel a flow of lubrication out of power gearbox housing 201 to lubrication return system 143 (shown in FIG. 1).

Epicyclic gear train 147 includes a sun gear 202, a plurality of planetary gears 204, a ring gear 206, and a carrier 208. In alternative embodiments, epicyclic gear train 147 is not limited to three planetary gears 204. Rather, any number of planetary gears may be used that enables operation of epicyclic gear train 147 as described herein. In some embodiments, LP shaft or spool 136 (shown in FIG. 1) is fixedly coupled to sun gear 202. Sun gear 202 is configured to engage planetary gears 204 through a plurality of complementary sun gear teeth 210 and a plurality of complementary planet gear teeth 212 circumferentially spaced about a radially outer periphery of sun gear 202 and a radially outer periphery of planetary gears 204 respectively. Planetary gears 204 are maintained in a position relative to each other using carrier 208. Planetary gears 204 are fixedly coupled to power gearbox 146. Planetary gears 204 are configured to engage ring gear 206 through a plurality of complementary ring gear teeth 214 and complementary planet gear teeth 212 circumferentially spaced about a radially inner periphery of ring gear 206 and a radially outer periphery of planetary gears 204 respectively. Ring gear 206 is rotationally coupled to fan blades 140 (shown in FIG. 1), disk 142 (shown in FIG. 1), and pitch change mechanism 144 (shown in FIG. 1) extending axially from ring gear 206. LP turbine 130 rotates the LP compressor 122 at a constant speed and torque ratio which is determined by a function of ring gear teeth 214, planet gear teeth 212, and sun gear teeth 210 as well as how power gearbox 146 is restrained.

Epicyclic gear train 147 can be configured in three possible configuration: planetary, star, and solar. In the planetary configuration, ring gear 206 remains stationary while sun gear 202, planetary gears 204, and carrier 208 rotate. LP shaft or spool 136 drives sun gear 202 which is configured to rotate planetary gears 204 that are configured to rotate carrier 208. Carrier 208 drives fan blades 140, disk 142, and pitch change mechanism 144. Sun gear 202 and carrier 208 rotate in the same direction.

In the star configuration, carrier 208 remains stationary while sun gear 202 and ring gear 206 rotate. LP shaft or spool 136 drives sun gear 202 which is configured to rotate planetary gears 204. Planetary gears 204 are configured to rotate ring gear 206 and carrier 208 is fixedly coupled to power gearbox 146. Carrier 208 maintains planetary gears 204 positioning while allowing planetary gears 204 to rotate. Ring gear 206 is rotationally coupled to fan blades 140, disk 142, and pitch change mechanism 144. Sun gear 202 and ring gear 206 rotate in opposite directions.

In the solar configuration, sun gear 202 remains stationary while planetary gears 204, ring gear 206, and carrier 208 rotate. LP shaft or spool 136 can drive either the ring gear 206 or carrier 208. When LP shaft or spool 136 is coupled to carrier 208, planetary gears 204 are configured to rotate ring gear 206 which drives fan blades 140, disk 142, and pitch change mechanism 144. Ring gear 206 and carrier 208 rotate in the same direction.

In the solar configuration where LP shaft or spool 136 is coupled to ring gear 206, ring gear 206 is configured to rotate planetary gears 204 and carrier 208. Carrier 208 drives fan blades 140, disk 142, and pitch change mechanism 144. Ring gear 206 and carrier 208 rotate in the same direction.

During operation, rotation of sun gear 202, planetary gears 204, ring gear 206, and carrier 208 centrifugally accelerates a flow of lubricant into power gearbox housing 201. The centrifugal acceleration of the flow of lubricant is greater than the acceleration due to gravity and prevents the flow of lubricant from draining into scavenge port 145 positioned in a bottom portion 216 of power gearbox housing 201. Lubricant remaining in power gearbox housing 201 increases windage, decreases power output, and decreases the fuel efficiency of gas turbine engine 110. To channel stagnant lubricant out of power gearbox housing 201, scavenge ports 145 are positioned around the circumference of power gearbox housing 201 and are aligned in axial direction A with epicyclic gear train 147. Positioning multiple scavenge ports 145 around the circumference of power gearbox housing 201 increases the removal rate of stagnant lubricant within power gearbox housing 201.

Scavenge ports 145 include a scoop 218, a scavenge port opening 220, and a scavenge conduit 222. Scoop 218 extends into power gearbox housing 201 and channels a flow of lubricant into scavenge port opening 220. Scoop 218 includes an angle that opposes the rotational direction of the flow of lubricant and ring gear 206. Scavenge port opening 220 channels a flow of lubricant into scavenge conduit 222 which channels a flow of lubricant to lubrication return system 143 (shown in FIG. 1).

Power gearbox housing 201 includes bottom portion 216 and a top portion 224 opposite bottom portion 216. Bottom portion 216 is oriented toward a surface of the earth during normal operations. Power gearbox housing 201 also includes two horizontal portions 226 oriented at a right angle relative to bottom portion 216.

In the exemplary embodiment, four scavenge ports 145 are positioned around the circumference of power gearbox housing 201. However, power gearbox housing 201 includes any number of scavenge ports 145 which enable power gearbox housing 201 to operate as described herein, including, without limitation, two scavenge ports 145, three scavenge ports 145, five scavenge ports 145, and six scavenge ports 145. A first scavenge port 228 is positioned at bottom portion 216 of power gearbox housing 201. A second scavenge port 230 is positioned in a top portion 224 of power gearbox housing 201. A third scavenge port 232 and a fourth scavenge ports 234 are positioned in a horizontal portion 226 of power gearbox housing 201. First scavenge port 228 removes stagnant lubricant located within bottom portion 216 of power gearbox housing 201. Second scavenge port 230 removes stagnant lubricant located within top portion 224 of power gearbox housing 201. Third and fourth scavenge ports 232 and 234 remove stagnant lubricant located within horizontal portions 226 of power gearbox housing 201.

In the exemplary embodiment, scavenge ports 145 are evenly spaced around the circumference of power gearbox housing 201. However, scavenge ports 145 may be irregularly spaced around the circumference of power gearbox housing 201. Specifically, when epicyclic gear train 147 is configured in the star configuration, planetary gears 204 remain in a static location. The lubricant accelerated into power gearbox housing 201 by planetary gears 204 hits power gearbox housing 201 at a consistent location. A scavenge port 145 corresponding to each planetary gear 204 is located around the circumference of power gearbox housing 201 at the location where lubricant is accelerated into power gearbox housing 201 by the corresponding planetary gear 204. Locating scavenge ports 145 strategically around the circumference of power gearbox housing 201 reduces stagnant lubricant within power gearbox housing 201.

The above-described gearbox with multiple scavenge ports provides an efficient method for removing lubricant from a gearbox. Specifically, multiple scavenge ports are positioned around the circumference of the gearbox housing. At least one scavenge port is coupled to a side portion of the gearbox housing to collect lubricant which is stagnant within the gearbox housing due to the centrifugal force of the gear assembly. Removing stagnant lubricant reduces windage within the gearbox housing, increases the power output of the gearbox, and increases the fuel efficiency of the aircraft engine.

An exemplary technical effect of the methods, systems, and apparatus described herein includes at least one of: (a) removing stagnant lubricant from a gearbox housing; (b) reducing windage in a gearbox; (c) increasing the power output of the gearbox; and (d) increasing the fuel efficiency of the aircraft engine.

Exemplary embodiments of the gearbox with multiple scavenge ports are described above in detail. The gearbox, and methods of operating such units and devices are not limited to the specific embodiments described herein, but rather, components of systems and/or steps of the methods may be utilized independently and separately from other components and/or steps described herein. For example, the methods may also be used in combination with other systems which require a gearbox, and are not limited to practice with only the systems and methods as described herein. Rather, the exemplary embodiment may be implemented and utilized in connection with many other machinery applications that require a gearbox.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gearbox comprising:
a gearbox housing having a top portion, first and second portions, and a bottom portion opposite the top portion, said gearbox housing is oriented such that said bottom portion is located in a position to which a fluid drains under the influence of gravity during normal operation, said first and second portions oriented at a right angle relative to said bottom portion;
at least one gear disposed within said gearbox housing, said at least one gear having a first axial position; and
a plurality of scavenge ports defined by said gearbox housing, said plurality of scavenge ports aligned axially with said at least one gear at the first axial position, wherein at least one scavenge port of said plurality of scavenge ports is located within said gearbox housing at one of said first and second portions.

2. The gearbox of claim 1, wherein said plurality of scavenge ports are configured to channel a flow of lubricant out of said gearbox housing.

3. The gearbox of claim 1, wherein each scavenge port of said plurality of scavenge ports comprises a scoop, a scavenge port opening, and a scavenge conduit.

4. The gearbox of claim 3, wherein said scoop is configured to collect a flow of lubricant within said gearbox housing and channel the flow of lubricant into said scavenge port opening.

5. The gearbox of claim 4, wherein said scavenge conduit is configured to channel said flow of lubricant out of said gearbox housing.

6. The gearbox of claim 5, wherein said plurality of scavenge ports comprises three scavenge ports.

7. The gearbox of claim 6, wherein two scavenge ports of said three scavenge ports are located within said gearbox housing at said first and second portions.

8. The gearbox of claim 7, wherein one scavenge port of said three scavenge ports is located within said gearbox housing at said bottom portion.

9. The gearbox of claim 5, wherein said plurality of scavenge ports comprises two scavenge ports.

10. The gearbox of claim 1, wherein said scavenge ports are irregularly spaced around said gearbox housing.

11. A gearbox comprising:
a gearbox housing having a top portion, first and second portions, and a bottom portion opposite the top portion, said gearbox housing is oriented such that said bottom portion is located in a position to which a fluid would drain under the influence of gravity during normal operation, said first and second portions oriented at a right angle relative to said bottom portion;
a gear assembly disposed within said gearbox housing, said gear assembly having a first axial position, said gear assembly comprising:
a sun gear;
a ring gear; and
a plurality of planet gears coupled to said ring gear and said sun gear; and
a plurality of scavenge ports defined by said gearbox housing, said plurality of scavenge ports aligned axially with said gear assembly at the first axial position, wherein at least one scavenge port of said plurality of scavenge ports is located within said gearbox housing at one of said first and second portions.

12. The gearbox of claim 11, wherein said plurality of scavenge ports configured to channel a flow of lubricant out of said gearbox housing.

13. The gearbox of claim 11, wherein said plurality of scavenge ports comprises a scoop, a scavenge port opening, and a scavenge conduit.

14. The gearbox of claim 13, wherein said scoop is configured to collect a flow of lubricant within said gearbox housing and channel the flow of lubricant into said scavenge port opening.

15. The gearbox of claim 14, wherein said scavenge conduit is configured to channel said flow of lubricant out of said gearbox housing.

16. The gearbox of claim 15, wherein said plurality of scavenge ports comprises three scavenge ports.

17. The gearbox of claim 16, wherein two scavenge ports of said three scavenge ports are located within said gearbox housing at said first and second portions.

18. The gearbox of claim 17, wherein one scavenge port of said three scavenge ports is located within said gearbox housing at said bottom portion.

19. The gearbox of claim 11, wherein said sun gear, said plurality of planet gears, and said ring gear are defined in a star configuration, each planet gear of said plurality of planet gears have a static location within said gearbox housing, each scavenge port of said plurality of scavenge ports located at a location around said gearbox housing corresponding to said static location of a planet gear of said plurality of planet gears, wherein each scavenge port of said plurality of scavenge ports is configured to channel a flow of lubricant from a corresponding planet gear of said plurality of planet gears out of said gearbox housing.

20. A turbomachine comprising:
a power shaft;
a gearbox housing having a top portion, first and second portions, and a bottom portion opposite the top portion, said gearbox housing is oriented such that said bottom portion is located in a position to which a fluid would drain under the influence of gravity during normal operation, said first and second portions oriented at a right angle relative to said bottom portion;
a gear assembly disposed within said gearbox housing, said power shaft rotationally coupled to said gear assembly, said gear assembly having a first axial position, said gear assembly rotatably coupled to said power shaft, said gear assembly comprising:
a sun gear;
a ring gear; and
a plurality of planet gears coupled to said ring gear and said sun gear; and
a plurality of scavenge ports defined by said gearbox housing, said plurality of scavenge ports aligned axially with said gear assembly at the first axial position, wherein at least one scavenge port of said plurality of scavenge ports is located within said gearbox housing at one of said first and second portions.

21. The turbomachine of claim 20, wherein said sun gear, said plurality of planet gears, and said ring gear are defined in a planetary configuration.

22. The turbomachine of claim 20, wherein said sun gear, said plurality of planet gears, and said ring gear are defined in a star configuration.

23. The turbomachine of claim 20, wherein said sun gear, said plurality of planet gears, and said ring gear are defined in a solar configuration.

* * * * *